United States Patent [19]

Yasuoka et al.

[11] Patent Number: 4,982,396
[45] Date of Patent: Jan. 1, 1991

[54] INFORMATION RECORDING MEDIUM AND APPARATUS USING REVERSIBLE PHASE CHANGE

[75] Inventors: Hiroshi Yasuoka, Kokubunji; Masahiro Ojima; Motoyasu Terao, both of Tokyo; Tetsuya Nishida, Koganei; Keikichi Andoo, Musashino, all of Japan

[73] Assignee: Hitachi, Ltd., Tokyo, Japan

[21] Appl. No.: 179,304

[22] Filed: Apr. 8, 1988

[30] Foreign Application Priority Data

Apr. 10, 1987 [JP] Japan .................. 62-86853

[51] Int. Cl.$^5$ .............................................. G11B 7/00
[52] U.S. Cl. .................................................. 369/100
[58] Field of Search ............... 369/100, 109, 110, 116, 369/275, 275.2; 346/76 L

[56] References Cited

U.S. PATENT DOCUMENTS

| | | | |
|---|---|---|---|
| 3,774,702 | 9/1988 | Giacomel | 369/100 |
| 4,712,207 | 12/1987 | Reno | 369/100 |
| 4,799,208 | 1/1989 | Satoh et al. | 369/100 |

Primary Examiner—Donald McElheny, Jr.
Attorney, Agent, or Firm—Antonelli, Terry, Stout & Kraus

[57] ABSTRACT

An information recording method and apparatus therefor utilizes an information recording medium having a recording film enabling reversible phase change. The information recording medium is irradiated with an energy beam while relatively moving the information recording medium and the energy beam so as to at least enable recording of information in accordance with phase state changes of the recording film caused by irradiation of the energy beam. The energy beam is modulated so that an intensity of the energy beam obtains a first level having a high power for one portion of coded data information to be recorded, obtains a second level different from the first level for a predetermined time for another portion of the coded data information, and then again obtains the first level to enable recording of the coded data information independently of a previous recording state on the information recording medium.

39 Claims, 6 Drawing Sheets

READOUT WAVEFORM 37

COMPARATOR LEVEL 39

FIG. 10B

DIFFERENTIATED WAVEFORM 42

COMPARATOR LEVEL 44

FIG. 10C

COMPARATOR OUTPUT WAVEFORM 40 OBTAINED FROM READOUT WAVEFORM

FIG. 10D

COMPARATOR OUTPUT WAVEFORM OBTAINED FROM DIFFERENTIATED WAVEFORM (GATE OUTPUT) 45

FIG. 10E

DATA OUTPUT SIGNAL

INFORMATION RECORDING MEDIUM AND APPARATUS USING REVERSIBLE PHASE CHANGE

BACKGROUND OF THE INVENTION

The present invention relates to an information recording method and an information recording apparatus using a reversible phase change caused by light irradiation, and in particular to an information recording method (using reversible phase change) capable of single beam overwriting i.e., capable of recording new information with a single beam spot while erasing information already recorded and capable of rewriting without leaving incompletely erased information called "unerased information" and an optical information recording apparatus using a rewritable phase change reversible optical disk.

A rewritable optical information recording apparatus using a recording film which changes in phase between a crystalline state and an amorphous state is already known. In such an apparatus, a high-power optical beam spot corresponding to the information to be recorded is irradiated onto a recording film to locally raise the temperature of the recording film. A phase change between the crystalline state and the amorphous state is thus caused to record the information. A resulting change in optical constant is read as a change in intensity of reflected light of a low-power light beam, the recorded information being thus reproduced. For example, a reversible optical disk having a phase change recording film is rotated and a light beam spot is condensed onto the recording film to raise the temperature of the recording film above its melting point as described in Proceedings of Spring Conference of the Japanese Society of Applied Physics, 7, p-x-1, (1983). After the optical beam spot has passed, that portion of the recording film is quenched to turn that portion into the amorphous state, information being recorded. And erasing is performed by irradiating an elliptic light beam which is longer in the beam travelling direction so as to keep the temperature of the recording film within a crystallizable temperature range which is not lower than the glass transition point and which is not higher than the melting point for a long time sufficient to promote the crystallization.

Further, double-beam pseudooverwriting (recording new information after data already recorded) is performed by arranging an erasing elliptic optical beam spot ahead of a recording circular light beam spot.

In an optical information recording apparatus using a phase change recording film which can be crystallized at high speed, the power of a single circular light beam spot is changed among a plurality of power levels to cause crystallization or amorphizing as described in Proc. SPIE, Vol. 695, pp. 105 to 109 ,1986), for example. That is to say, a part of the recording film irradiated by an light beam having a power capable of raising the temperature of that part assumes an amorphous state when it is cooled. On the other hand, a portion of the recording film irradiated by an light beam having such a power as to raise the temperature of that portion above the glass transition point and below the melting point assumes a crystalline state.

However, it is very difficult to provide a difference between quenching and annealing by passing a single light beam spot through the recording film once. The prior art of raising the light beam in accordance with information to be recorded for rewriting the information had a problem that an incompletely erased portion remains after over writing. In phase change optical disks, recording films which are not processed yet after the vapor deposition are not uniform in many cases when seen in minute space ranges. Initialization for attaining uniformity is thus required. In the initialization, an optical beam of high power is irradiated to raise the temperature above the melting point once. In addition, a part to be recorded must be turned into an amorphous state or a crystalline state in some recording methods. The necessity for such initialization results in a problem of inconvenient use.

SUMMARY OF THE INVENTION

An object of the present invention is to (1) make possible single beam overwrite without leaving unerased information;

(2) prevent attenuation of a signal due to differentiation by making a reproduced signal itself a differential waveform to eliminate the necessity of differentiation;

(3) make servo operations such as tracking and automatic focusing sure by making the reproduced signal have a differential waveform so that the average level of the light read out may not be changed even when recording is performed;

(4) attain single bear overwriting (recording) in which a readout waveform charge does not largely depend upon a relative velocity v between the recording medium and the energy beam spot and the crystallization speed and hence the composition of the recording film;

(5) make initialization unnecessary;

(6) attain a single beam overwrite recording capable of producing a desired readout signal waveform when the crystallization speed of the recording film is defined; and (7) indicate a crystallization speed of the recording film capable of producing a desired readout signal waveform when the relative speed between the recording medium and the energy beam spot is defined.

In accordance with the recording method of the present invention, the above described object is attained by performing energy beam irradiation for erasing with a high beam power, lowering the power level for a time shorter than the irradiation time, and then raising the power again for recording.

That is to say, in accordance with the present invention, the intensity of laser light is kept at the readout power level while the optical information recording medium is being rotated, and the power is raised at necessary portions to irradiate an energy beam of high power to portions already recorded. As a result of passage of an light beam having a high power over portions already recorded, the temperature of the recording film rises above the melting point. Accordingly, an existing data portion reaches a fusion state once whether it is in the crystallization state or in the amorphous state. Thereafter, the entire irradiated portion assumes nearly the same state when it is cooled. Accordingly, incompletely unerased portions are largely reduced. Since the light extinguishment (OFF) time for recording is shorter than the preceding or succeeding time of a higher power level, all portions other than a new recording point are erased. The final state caused by erasing may be a crystalline state, an amorphous state, or an intermediate state in which crystallization proceeds to some degree.

In accordance with the present invention, the recorded portion assumes a phase state different from that of an erased portion, and assumes an amorphous state and a crystalline state in a short time.

Further in accordance with the present invention, the temperature of most portions of the writing area of the recording film rises above the melting point in the initial recording operation of a recording film which has not been processed since vapor deposition. Even if the recording film has not been processed since vapor deposition, therefore, information can be recorded on the recording film without irradiating a laser beam or heating it once.

DESCRIPTION OF THE PREFERRED EMBODIMENTS

Prior to description of the present invention, a conventional recording method including the steps of condensing a light beam as a spot onto a portion of a recording film to raise the temperature of that portion above the melting point, and quenching that portion after the passage of the light beam spot to turn that portion into an amorphous state and thereby record information will now be described. When a portion of the recording film is to be amorphized, for example, a light beam having such a power as to raise the temperature of the recording film above the melting point is irradiated. When this light beam spot passes through a point on the recording film, that portion is cooled after the temperature of that portion has exceeded the melting point $T_m$ as represented by a curve E of FIG. 7. It depends upon time during which that portion passes through a temperature range of a large crystallization speed between the melting point $T_m$ and the glass transition point $T_x$ whether that portion is amorphized or not. When a portion of the recording film, is to be crystallized, a light beam having such a low power that the temperature of that portion may not reach the melting point $T_m$ is irradiated. When this light beam spot passes through a point on the recording film, the length of time during which the temperature of that portion is kept above the glass transition point $T_x$ and below the melting point $T_m$ is several times at most as long as the cooling time of the above described case of amorphizing. In this way, it cannot be said that the difference between quenching required for amorphizing and gradual cooling required for crystallization is large.

When information is recorded while a disk is rotated at a constant number of revolutions, the linear velocity obtained at an inner circumference of the disk is half that obtained at an outer circumference, and the passage time of the optical beam spot obtained at an inner circumference of the disk is twice that obtained at an outer circumference. Accordingly, the quenching time and the annealing time are different by a factor of 2 between the inner circumference and the outer circumference, respectively. For making a portion irradiated by an optical beam having a high power amorphous and a portion irradiated by an optical beam having a low power crystalline in both the inner circumference and the outer circumference, therefore, a recording film of composition having an optimum crystallization speed must be formed.

In case the crystallization speed of a recording film is slower than the optimum crystallization speed, crystallization proceeds a little when a light beam having a high power is irradiated onto the recording film to make it amorphous. Even if an optical beam having a low power is irradiated to crystallize the recording film, the crystallization proceeds only part of the way because the gradual cooling time is several times at most as long as the quenching time. In this case, both the recorded portion and the erased portion of the recording film are in intermediate states in which crystallization has proceeded to some degree. The recorded portion is discriminated from the erased portion by a difference in degree of crystallization progress of the recording film state. Since complete crystallization is not obtained by irradiating a beam once, the recording state after new information is written depends upon the previous recording state. This means that pre-recorded information remains.

Figures 6A, 6B:
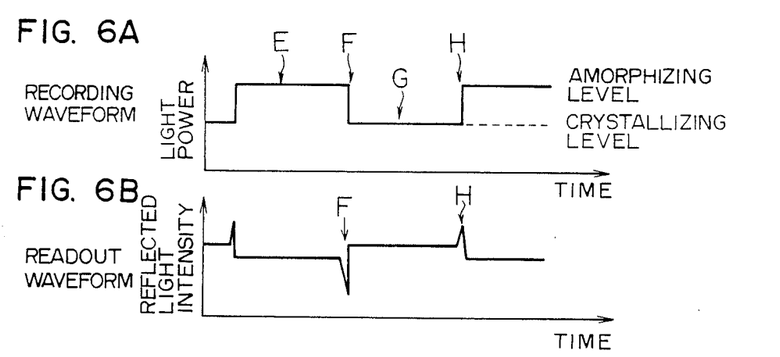
FIGS. 6A and 6B show a typical recording waveform of single beam overwriting and a readout waveform obtained when single beam writing is performed under the condition of an equation (2), respectively.

A case where the crystallization speed of the recording film is higher than the optimum crystallization speed will now be described. When information is recorded by changing the light power level as shown in FIG. 6A, a large change in reflectivity is caused at a portion where the light power abruptly changes. At other portions on the recording film, a noticeable change in reflectivity is not caused. The reason can be described as follows. Since the crystallization speed is high, a portion of the recording film passed by a light beam spot having such a power as to raise the temperature above the melting point is crystallized to some degree while it is cooled from the melting point. And a portion passed by a light beam spot having a crystallization power level is further crystallized as compared with another portion struck by light having a high power. Since both the portion irradiated by light having a high power and the portion irradiated by light having a low power are comparatively advanced in crystallization, the difference between those states is slight. As a result, the difference in reflectivity is slight. In a portion where the power of the light beam increases from a low level to a high level, the light beam spot gets away the instant the light power has increased. And the temperature of that portion rises above the destination temperature (FIG. 7G) obtained by irradiating an light beam having a low level as represented by a broken line H of FIG. 7. Since the crystallization process is advanced by thermal energy, crystallization proceeds more rapidly as the temperature becomes higher so long as the temperature does not exceed the melting point. In a portion where the light power increases from the low level to the high level, therefore, the crystallization proceeds most. In a portion where the power is lowered from the high level to the low level, a more significant quenching effect than any other portion is obtained as represented by a broken line F of FIG. 7, resulting in an amorphous state. In this way, the reflectivity largely changes at portions where the light power abruptly increases or decreases. The prior art of rewriting data by intensifying the optical beam in accordance with information to be recorded has a problem that unerased information largely remains.

Therefore, a feature of the present invention is to perform energy beam irradiation for erasing with a high beam power, lower the power level for a time shorter than the irradiation time, and thereafter raise the power again for recording.

Since the power is raised at a necessary portion to irradiate an energy beam having a high power onto an already recorded portion in accordance with the present invention, the temperature of the recording film rises above the melting point as a result of passage of the high-power energy beam over the already recorded portion. Whether an existing data portion is in a crystalline state or in an amorphous state, therefore, the data portion comes into a fusion state once. Thereafter, the entire irradiated portion assumes nearly the same state at the time of cooling. Accordingly, (unerased) information is largely reduced. Since the extinguishment or off time for recording is shorter than its preceding or succeeding high-power level time, all portions other than a new recording point are erased.

Which phase state is caused by erasing depends upon the relative length relation between the time required for the temperature of the recording film to pass through the temperature range allowing high-speed crystallization to be lowered (cooling time) and the time required for the recording film to be crystallized. When the cooling time is longer than the crystallization time, for example, the recording film is crystallized. When the cooling time is shorter than the crystallization time, the recording film assumes an amorphous state. When the cooling time is close to the crystallization time, the recording film assumes an intermediate state in which crystallization has proceeded to some degree. Strictly speaking, the crystallization speed depends upon the temperature T and the progress degree X of crystallization. In the three-dimensional growth, for example, the final state can be represented by summation one by one as crystallization ratio:

$$X = 1 - exp\{-\int \alpha(t)dt\}$$

crystallization speed:

$$\alpha(t) = \alpha_o exp\left(-\frac{\Delta E}{K_B T(t)}\right)$$

where $\alpha_o$ denotes a constant, $K_B$ Boltzmann's constant, and $\Delta E$ denotes activation energy. However, the temperature of the recording film monotonously rises by the passage of the light beam and then monotonously falls. As described above, therefore, the erase state can be roughly determined by the relative length relation between the cooling time and the crystallization time.

The crystallization time t depends upon the property of the recording film, while the cooling time depends upon the relative velocity V between the recording medium and the light beam spot. That is to say, a high-temperature portion caused by the light beam moves within the recording film at the velocity V. This movement speed defines the cooling time of respective portions. To be concrete, it is now assumed that a light beam spot has Gaussian distribution, intensity $e^{-2}$ at a radius r, and such a power that the recording film may just reach the melting point. When such an optical beam is irradiated, the radius of a region allowing high-speed crystallization generated within the recording film becomes ar, where a is a constant depending upon thermal constants (i.e., thermal conductivity, specific heat and density) of the optical information recording medium and the crystallization temperature of thereof. In most cases, a satisfies the relation $0 < a \leq 1$. When the optical beam spot passes over the recording film at the velocity V, therefore, cooling time required for the temperature of the recording film to fall below the temperature range allowing high-speed crystallization is represented by $$\frac{ar}{v}$$

Depending upon the relative length relation between the crystallization time $\tau$ of the recording film and the cooling time $$\frac{ar}{v}$$

therefore, the erase state becomes a crystallization, state, an intermediate state or an amorphous state.

Crystallization state: $\frac{ar}{v} > \tau$     (1)

Entermediate state: $\frac{ar}{v} \approx \tau$     (2)

Amorphous state: $\frac{ar}{v} < \tau$     (3)

Figure 1A:
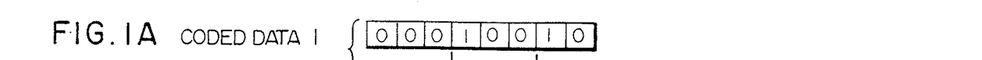
FIGS. 1A to 1E show the change of data and the optical recording power corresponding thereto with time in accordance with the present invention.
Figures 1B, 1C:
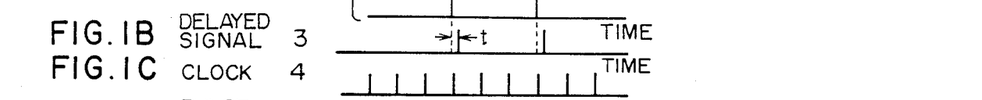
Figure 1D:
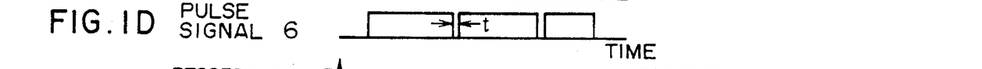
Figure 1E:
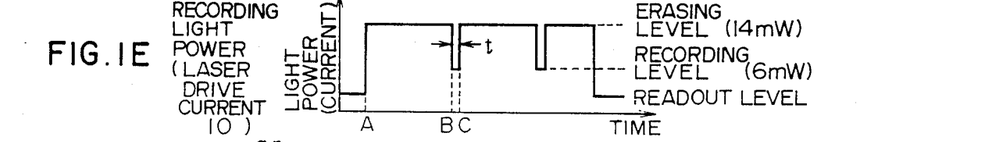

The recording state caused by the recording method of the present invention and the process leading to the recording state will now be described. Recording is performed by irradiating an optical beam having a power lower than the erase power level only for a time t as shown in FIG. 1E or by turning off the optical beam. However, it is preferred that t is close to the time required for the high-temperature portion to pass over a portion of the recording film. The reason will now be described. The recording method according to the present invention corresponds to a method obtained by making F of FIGS. 6A and 6B approach H extremely. It is desirable that the space between F and H is nearly equal to the size of the high-temperature portion. And t is desired to be close to $$\frac{2ar}{v}$$

required for the high-temperature portion to pass over a portion of the recording film. The reason will now be described. The recording method according to the present invention corresponds to a method obtained by making F of FIGS. 6A and 6B approach H extremely. It is desirable that the space between F and H is nearly equal to the size of the high-temperature portion. And t is desired to be close to $$\frac{2ar}{v}$$

Figure 1F:
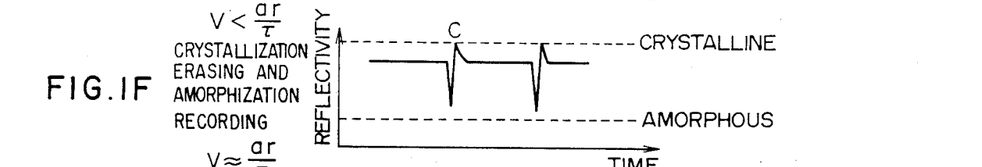
FIGS. 1F to 1H are readout waveform diagrams corresponding to FIGS. 1A to 1E.
Figure 1G:
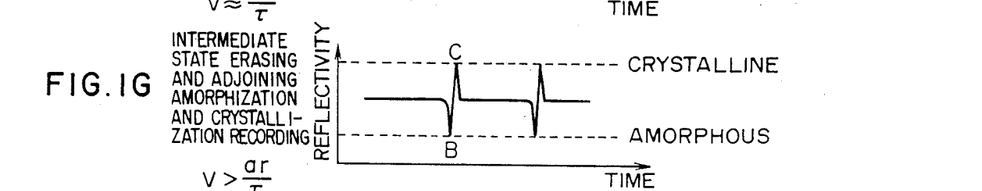

Unlike the erased portion, the recording portion assumes an amorphous state (FIG. 1F), a crystallization state (FIG. 1H) or a pair of a crystalline state and an amorphous state adjoining each other (FIG. 1G).

Depending upon the crystallization time $\tau$ of the recording film and the velocity v of the recording line, the recording state becomes one of these states. The recording process leading to each recording state will now be described in relation to the above described erase condition or erase state.

Figure 7:
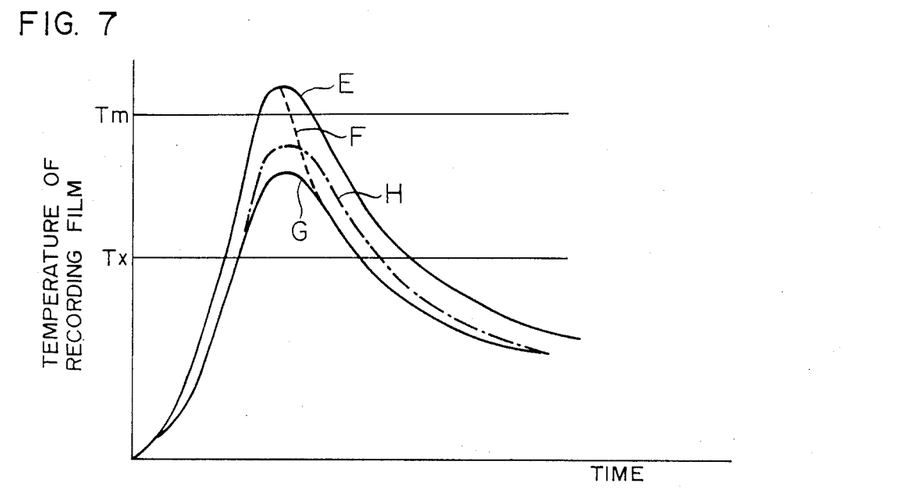
FIG. 7 shows results of numerical simulation for temperature changes of respective portions of a recording film obtained when single beam overwrite is performed with an optical power illustrated in FIG. 6A.

First of all, a case where the erase state represented by expression (1) becomes the crystalline state. In this case, the crystallization time is short or the linear velocity v is slow, and crystallization is performed while the recording film is cooled from the melting point to the crystallization temperature during the erasing operation. In case the optical power is lowered only for a time t during the recording operation, a larger quenching effect as compared with other portions is obtained in a portion where the light power on the recording film is changed to a low level as shown in FIG. 7, resulting in amorphization. In a portion irradiated by an light beam having a low power level and in a portion where the light power abruptly increases from a low level to a high level, the temperature is kept in a range allowing high-speed crystallization (as represented by G and H of FIG. 7). This is a condition under which crystallization proceeds as compared with the erasing state. However, crystallization is already completed and a state change is slight. In view of crystallization, an independent portion of an amorphous state is generated (FIG. 1F).

A case represented by expression (2), i.e., a case where the erasing state becomes an intermediate state with crystallization advanced to some degree will now be described. This is the case where the cooling time during the erase operation is nearly equal to the crystallization time in length. In case the light power is lowered only for a time t in the recording operation, a portion on the recording film where the optical power abruptly decreases from a high level to a low level assumes an amorphous state in the same way as the first case. In a portion irradiated by an light beam having a low power level and in a portion where the optical power is raised from a low level to a high level, the temperature is in a range allowing high-speed crystallization and hence the crystallization proceeds. Especially in a portion where the optical power increases to a high level, a higher temperature than that of the portion of G in FIG. 7 is reached as represented by H of FIG. 7, and hence the degree of crystallization becomes the greatest (FIG. 1G).

Figure 1H:
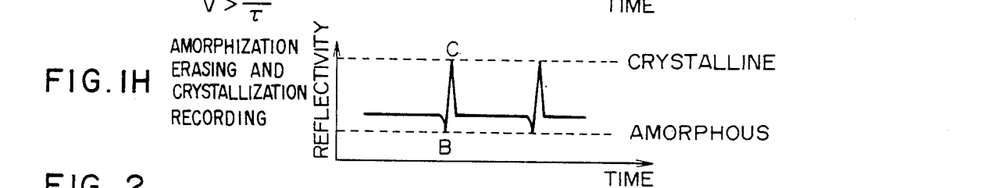

The case where the erasing state becomes an amorphous state as represented by expression (3) will now be described. In this case, the cooling time in the erasing operation is shorter than the crystallization time $\tau$, and an amorphous state is caused during the cooling time. In case the optical power is lowered only for a time t in the recording operation, a quenching effect is obtained in a portion where the optical power on the recording film abruptly decreases from a high level to a low level. Since it is almost the same as the erasing state, however, the difference between the states is slight. In a portion irradiated by an optical beam having a low power level, and in a portion where the optical power abruptly increases from a low level to a high level, the crystallization condition is satisfied, resulting in a crystalline state. Especially in a portion where the optical power abruptly increases from a low level to a high level, the degree of crystallization is maximized (FIG 1H).

(Embodiment 1)

Figure 2:
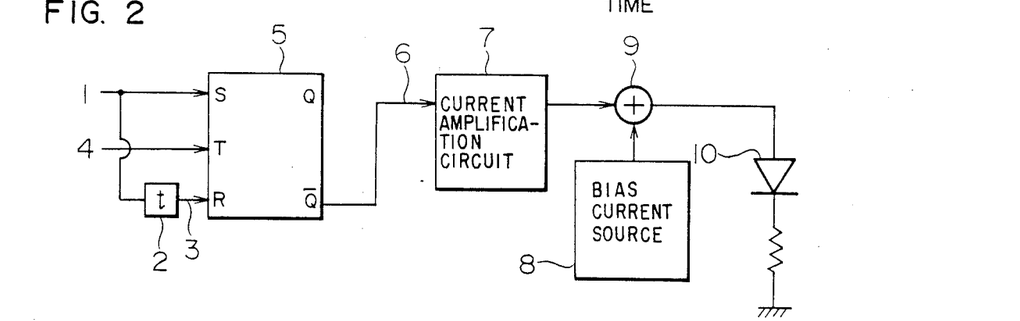
FIGS. 2 is a block diagram of a circuit for converting coded data into a recording signal, i.e., a laser drive signal in accordance with the present invention.

FIGS. 1A to 1E show an embodiment of an information recording method according to the present invention, and FIG. 1E is a graph showing the change of a recording optical power with time. FIG. 2 is a block diagram of a circuit for converting coded data 1 into a semiconductor laser drive current. From the coded data signal 1 and a pulse signal 3 delayed in a delay circuit 2 by time t as compared with the signal 1, a pulse signal 6 is obtained as an output $\overline{Q}$ of a flip-flop circuit 5. In synchronism with a clock signal 4, the pulse signal 6 remains at a logic "0" for only a time t from the moment the data signal 1 changes to a logic "1". All the time excepting t, the pulse signal 6 is at a logic "1". This signal 6 is converted into a current and amplified in a current amplification circuit 7. The resultant signal and the output of a DC bias current source 8 are added in a summing circuit 9 to produce a laser drive current for obtaining a recording optical power illustrated in FIG. 1E.

Figure 3:
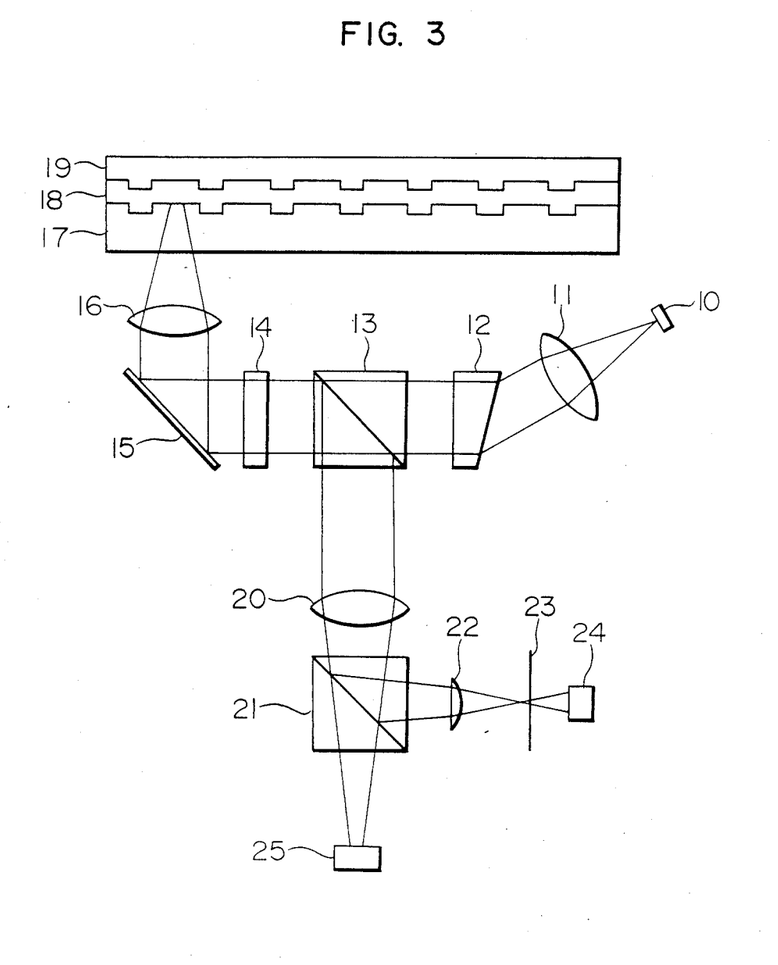
FIG. 3 is a schematic diagram showing an optical recording, erasing and readout apparatus used for the present invention.

FIG. 3 shows an example of configuration of an optical recording, erasing and reproducing apparatus used in the present invention. On an optical disk substrate 17 having track guide grooves formed thereon, a crystalline-amorphous phase change recording film 18 is vapor-deposited. On the film 18, a guard film 19 is vapor-deposited to make a phase change optical disk. Laser rays are condensed onto the phase change optical disk thus made. Laser rays emitted from a semiconductor laser 10 are collimated by a coupling lens 11. A circular light beam is formed by a prism 12. The polarization plane is rotated by 45degrees in a quarter-wavelength plate 14. A light spot is positioned on a track by a galvanomirror 15 and focused on the phase change recording film 18 by a condenser 16. The polarization plane of the reflected rays from the optical disk is further rotated by 45 degrees in the quarter-wavelength plate 14. Only the reflected rays from the optical disk are reflected by a polarizer 13. The resultant reflected rays are condensed by a convex lens 20 and bisected by a polarizer 21. The reflected rays are detected by a detector 24 for automatic focusing. The condenser 16 is moved in the optical axis direction by the signal thus detected, resulting in automatic focusing control. A cylindrical lens 22 and a knife edge 23 constitute an automatic focusing optical system. Light rays transmitted by the polarizer 21 are detected by a tracking detector 25. The galvanomirror 15 is rotated under the control of the signal thus detected to always position the optical spot on a track guide groove or between grooves. In the recording and erasing operation, reflected rays from the recording film 18 are intensified, and false operation is caused in the automatic focusing control and tracking control. During that time, gains for amplifying voltages supplied from the tracking detector and the automatic focusing detector are made small.

As for an optical disk which has not been used yet, data can be recorded on the disk so long as the recording film is not treated yet after vapor deposition and is uniform to some degree. When the recording film is not uniform, however, it is desirable to initialize the recording film by irradiating a light beam of the erase level onto recording tracks and raising the temperature of the recording film above the melting point.

The recording and erasing method used when information is written into a recording portion which is not used yet for the first time or when new information is overwritten on a portion with information already recorded thereon to rewrite the information will now be described. At the same time that the optical beam spot arrives at a location on the recording track to be rewritten (point A of FIG. 1E), the laser power is raised to the erase level. When the light beam spot arrives at a location where information "1" is to be newly recorded (point B of FIG. 1E), the laser power is lowered to the recording laser level. Thereafter, the laser power is raised to the erasing level again (point C of FIG. 1E). The erasing level is such a level that the temperature of the recording film will rise above the melting point at least around the center of an irradiated portion. As the erasing level is raised, unerased information can be reduced. Properties of the recording film depend upon the temperature even above the melting point. As the temperature becomes higher, atoms easily move, resulting in reduced viscosity. As the temperature becomes higher, a region whose temperature rises above the melting point becomes wider.

It is possible to record information under the condition that the recording power level is above zero and below ¾ of the erasing level and the time t during which the recording power level is maintained is in a range from 0.03 μsec to 1 μsec for a linear velocity of 2 m/sec. If the time t during which the recording power level is maintained is in a range from 0.1 μsec to 0.8 μsec and the recording power level is in a range from the reproduction level to 60% of the erasing level, a larger reproduced signal is obtained. The recording condition and the reproduced waveform will now be described concretely.

Information was recorded and erased on an optical disk in which the crystallization time τ of the recording film is approximately 0.1 μsec. A radius r where the intensity of the optical beam spot becomes $e^{-2}$ is 0.8 μm. It was found that the constant a in expression (1) relating to the determination of the recording state and the erasing state was approximately 0.25 by deriving the velocity of approximately 2 m/sec of the recording linear where the erasing state became the intermediate state.

First of all, an example in which information is rewritten with recording linear velocity of 2 m/sec or less and crystallization erasing and amorphization recording are performed will now be described. The reproduced waveform obtained when a light beam time-modulated as shown in FIG. 1E is irradiated with a recording line velocity of 1 m/sec is shown in FIG. 1F. This irradiation condition is represented by expression (1). The erase level of the light beam is above 7 mW. As the power level becomes higher, less information remains unerased. Information can be recorded when the recording level is in a range from 0 to ¾ of the erasing level. In particular, it is desired that the recording level is in a range from the reproduction level to 60% of the erasing level. When the time t during which the irradiation light beam power is kept at the recording level is in a range from 0.03 μsec to 1 μsec, information could be recorded. For the purpose of increasing the recording density, it is advantageous that t is shorter. For attaining a large degree of modulation, however, it is desired that the relation t=

$$\frac{2ar}{v}$$

is satisfied more closely. Further, t could be shortened by lowering the recording power level.

The recording state is reproduced by using the fact that the reflectivity in a crystalline state is different from that in an amorphous state and by detecting the intensity of the reflected rays when reproducing light rays are irradiated. In the reproduced voltage of FIGS. 1F to 1H, a high intensity of reflected light corresponds to a crystalline state, while a low intensity of reflected light corresponds to an amorphous state. Depending upon the thickness of the recording film and the wavelength of the reproducing light, however, an opposite case may be caused. This is caused because the reflectivity of a medium is largely influenced by a multiple-interference effect of light rays on the recording film.

(Embodiment 2)

An example of single beam overwrite with a recording linear velocity of 2 m/sec will now be described. Other conditions are the same as those of the embodiment 1. This light irradiation condition is a condition represented by equation (2). When a light beam which has undergone time-power modulation as shown in FIG. 1E is irradiated, the readout waveform exhibits intensity of reflected light as shown in FIG. 1G. A low reflectivity portion corresponds to an amorphous state, while a high reflectivity portion corresponds to a crystalline state. It is understood from FIG. 1G that the erased portion assumes an intermediate state with crystallization advanced to some degree and the recorded portion assumes a state in which a pair of the amorphous state and crystalline state are adjoining each other. The irradiation light power required for erasing is 10 mW or more. If the power of the optical beam is raised from 10 mW, unerased residual information can be reduced. Information can be recorded when the recording level is in a range from zero level to ¾ cf the erasing level. In particular, it is desirable that the recording level is in a range from the reproducing level to 45% of the erasing level. When the time t during which the power of the irradiated light beam was kept at the recording level was in a range from 0.03 μsec to 0.8 μsec, information could be recorded.

(Embodiment 3)

An example in which a single beam overwriting was performed with a recording linear velocity of 4 m/sec will now be described. Other conditions are the same as those of the embodiment 1. This light irradiation condition is a condition represented by the above described expression (3). When an optical beam modulated as shown in FIG. 1E is irradiated, the reproduced waveform exhibits reflected light intensity as shown in FIG. 1H. It was confirmed that the erased portion was in an amorphous state and the recorded portion was in a crystalline state. The irradiated light power required for erasing is 14 mW or more. As the power of the light beam becomes higher, the residual from the erasing operation can be reduced. The recording level is desired to be in a range from zero to ¾ of the erasing level. It is more desirable that the recording level is in a range from the reproducing level to 45% of the erasing level. When the time during which the irradiated light beam power was kept at the recording level t was in a range from 0.03 μsec to 0.5 μsec, information could be recorded.

Figure 8A:
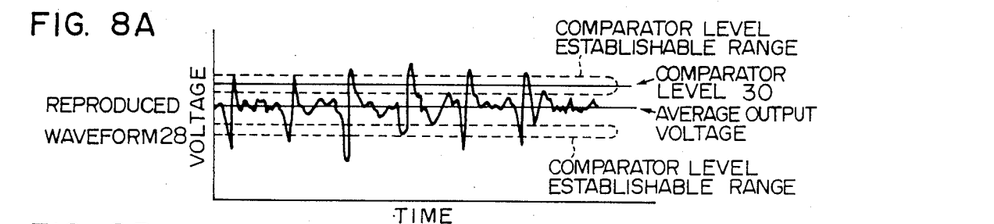
FIGS. 8A and 8B show a readout waveform and an output data signal obtained therefrom respectively.
Figure 8B:
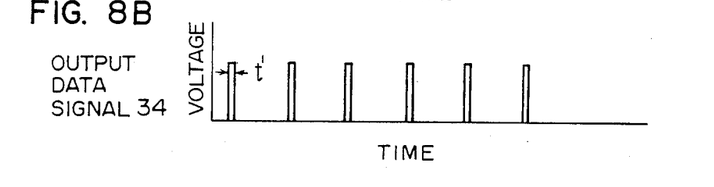
Figure 9:
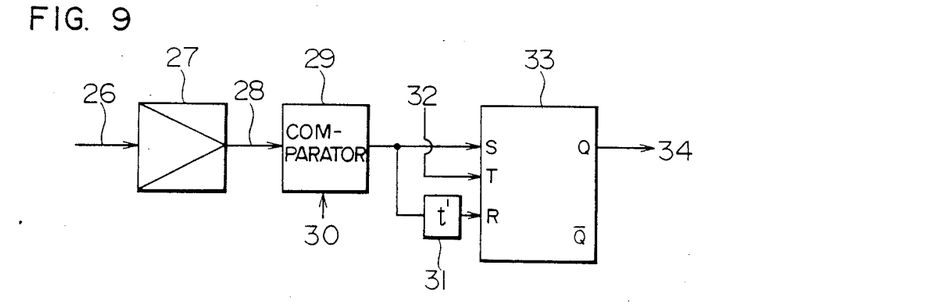
FIG. 9 is a block diagram of a circuit used for converting a readout waveform to an output data signal.

The reproduced signal obtained as described above can be processed as described below. In a first method, a reproduced signal 28 is coded into a binary value by using a comparator level 30 which is different from the average output voltage as shown in FIGS. 8A and 8B. FIG. 9 is a block diagram of a circuit used for the signal processing. A detected signal 26 of light rays is amplified by a voltage amplifier 27. Only when a reproduced waveform 28 thus obtained exceeds the comparator level 30 or is below the comparator level 30, a comparator 29 generates a pulse. From this pulse and a pulse obtained by delaying this pulse by a time τ in a delay circuit 31, a flip-flop circuit 33 produced an output data signal 34 having a pulse width t' and corresponding to a reproduced. Signal in synchronism with a clock signal 32. A readout signal causing few errors was obtained by shifting the established comparator level from the average output voltage by 1/10 to 9/10 of the difference between the average output voltage and the peak output voltage of the recording portion. It is more desirable that the shift is in a range of ¼ to ⅔ of the difference. In case peak output voltage appears on both sides of the average output voltage, it is desirable to establish the comparator level on a larger peak side or on a side where the larger value obtained among the differences between the peak or dip level and the level of the erased portion is minimized because of their variation (i.e., the comparator level establishable range shown in FIG. 8A) is larger.

Figure 10A:
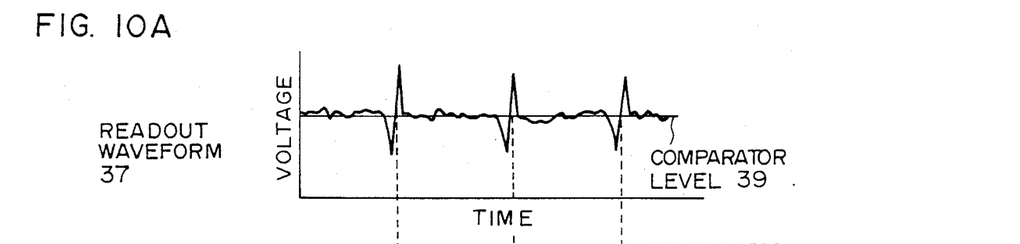
FIGS. 10A to 10E show a method for producing an output data signal from a reproduced waveform with little errors.
Figure 10B:
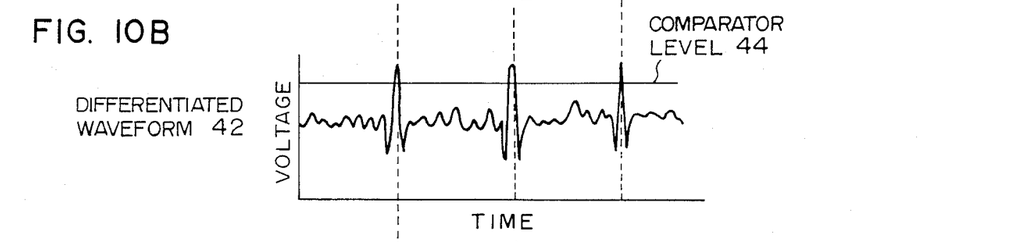
Figure 10C:
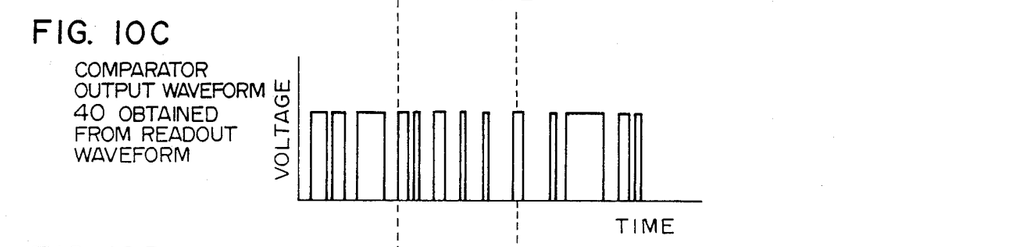
Figure 10D:
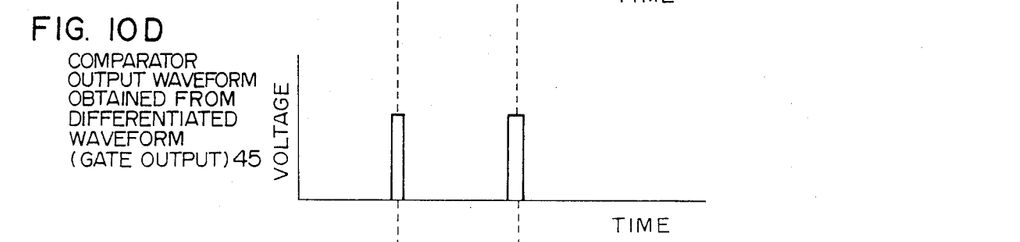
Figure 10E:
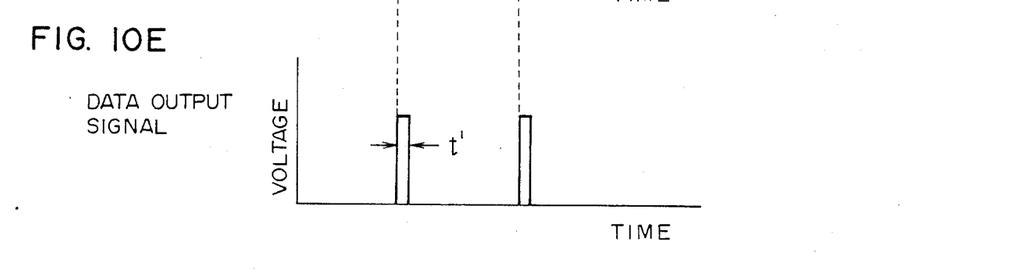
Figure 11:
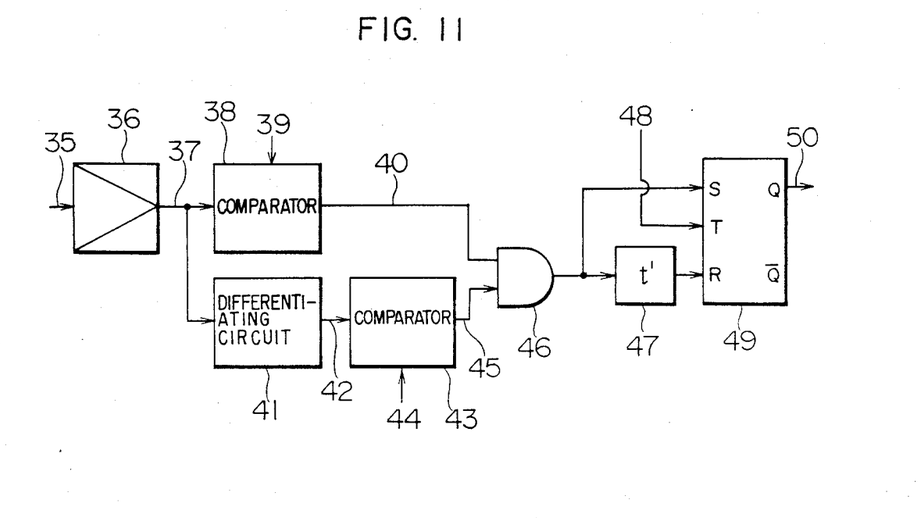
FIG. 11 is a block diagram of a circuit used for converting a readout signal to an output data signal in accordance with the method shown in FIGS. 10A to 10E.

When a second method is used, a reproduced waveform shown in FIG. 10A is once differentiated. While a resultant gate signal as shown in FIG. 10D is a logic 1, a single pulse is generated the moment the reproduced waveform of FIG. 10A crosses a comparator level 39 established at the average output voltage. The reproduced waveform is thus converted into binary values. FIG. 11 is a block diagram showing the method. A detected signal 35 of light rays is amplified by a voltage amplifier 36 to produce a reproduced waveform 37. A comparator 38 having the comparator level 39 established at the average output voltage produces a comparator signal 40 which is at a logic 1 only when the readout voltage is not below the comparator level as shown in FIG. 10C. On the other hand, the reproduced waveform of FIG. 10A is differentiated in a differentiation circuit 41. A resultant differential waveform 42 as shown in FIG. 10B is supplied to a comparator 43 having a comparator level 44 established in the same way as FIG. 8A. As a result, a gate output 45 having pulses only in the vicinity of recorded portions as shown in FIG. 10D is obtained. This gate output 45 and the output signal 40 of the reproduced waveform comparator undergo AND logic operation in an AND circuit 46. The moment the voltage of the recording portion of the reproduced waveform 37 exceeds the comparator level 39, therefore, a pulse is generated. In the same way as FIG. 9, this pulse is supplied to a delay circuit 47 for delaying the pulse by time τ' and a flip-flop circuit 49. It is thus possible to obtain a data output signal 50 having a pulse width τ' as shown in FIG. 10E in synchronism with a clock signal 48. Owing to this method, false signals caused by level variation of the erasing portion are removed, and readout signals causing few errors in the same way as FIG. 8B are obtained.

(Embodiment 4)

When a disk-shaped phase change optical information medium is rotated at a constant number of revolutions, the recording line velocity condition might vary in the range from the above described expressions (1) to (3) in the inner circumference and the outer circumference of the disk. By making the erase power level and the record power level higher and shortening the time τ during which the recording level is maintained as the information is recorded at an outer circumference, it is possible to record the information under optimum recording conditions and reduce a change in reproduced waveform caused by difference in recording linear velocity. For example, it is desirable that the light power is increased by $\sqrt{v}$ times according to the velocity v, and t is close to a value satisfying the relation $$t = \frac{2ar}{v}.$$

It is also permissible to change the composition or layer thickness of the recording film and the composition or layer thickness of the guard film in the radius direction of the disk stepwise or continuously to make the crystallization speed larger or cooling more difficult as the circumference is located at an outer position. Both of them may be performed. In some cases, however, nearly the same reproduced signals can be obtained even if the film is made uniform from an inner circumference to an outer circumference and information is recorded under the same recording condition, by choosing a suitable value as the crystallization speed of the recording film. In case the thickness of the guard film is changed, it is desirable to make the film thickness on the inner circumference side thicker.

(Embodiment 5)

Figure 12A:
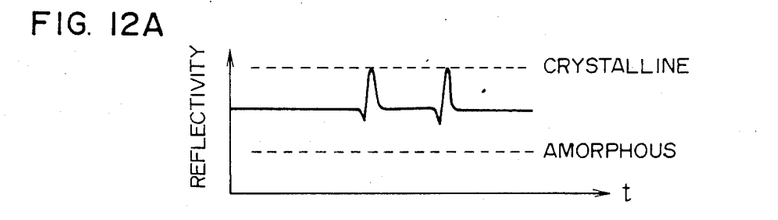
FIGS. 12A and 12B show other examples of a readout waveform according to the present invention.
Figure 12B:
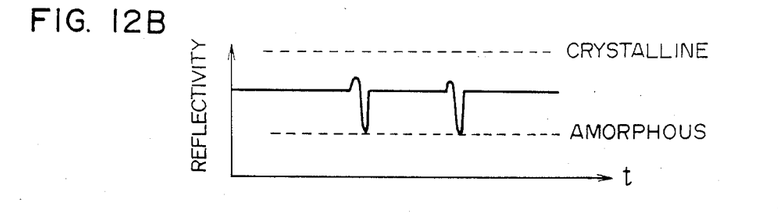

A method for recording information so that the reproduced signal may have a waveform as shown in FIG. 12A or FIG. 12B even under the condition that the readout signal has a waveform as shown in FIG. 1G will now be described.

Figure 4A:
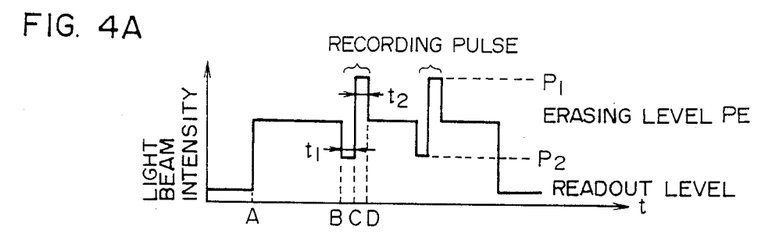
FIGS. 4A, 4B and 5 show such changes of an light irradiation beam with time as not to change the reproduced waveform even if data are recorded at linear velocities in a wide range.

First of all, a recording method producing a reproduced signal waveform as shown in FIG. 12A will now be described. The moment the light beam arrives at a portion to be recorded, the light power is lowered to $P_2$ for a time $t_f$ as shown in FIG. 4A, and succeedingly the light power is raised to $P_1$ for a time $t_2$. On the recording film, a portion irradiated by a light beam having a power $P_2$ reaches a temperature allowing crystallization. Even after the light beam spot has passed, the recording film is kept at the crystallization temperature because there is an heat in flow due to $P_2$. As a result, crystallization proceeds to some degree. At point B, however, $t_1$ and $P_2$ are set as described below so that an amorphous state may not be easily caused. That is to say, $t_1$ and $t_2$ does not exceed $$\frac{2ar}{v}$$

, and $P_2$ does not exceed the erasing level, while $P_1$ is not level than $P_E$. However, it is more desirable that the area is $t_1 \times (P_E - P_2)$ is closer to that of $t_2 \times (P_{-PE})$. In case of recording with 2 m/sec, for example, the readout waveform as shown in FIG. 1H could be obtained by recording information under the condition that $t_1 = t_2 = 0.5$ μsec, $P_E = 13$ mW, $P_1 = 18$ mW and $P_2 = 8$ mW. However, the phase state of the erased portion is an intermediate state between the crystalline state and the amorphous state.

Figure 4B:
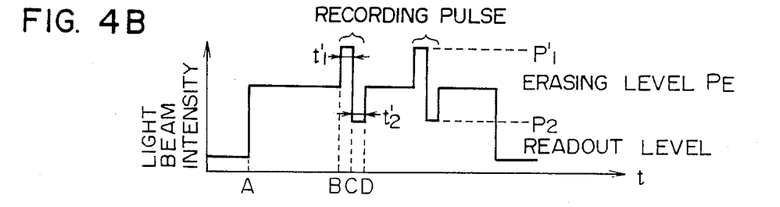

A recording method for obtaining a reproduced signal waveform as shown in FIG. 12B will now be described. The moment the light beam arrives at a portion to be recorded, the optical power is raised to $P_1'$ for a time $t_1'$ as shown in FIG. 4B, and succeedingly the optical power is lowered to $P_2'$ for a time $t_2'$. On the recording film, a portion where the power is largely lowered from $P_1'$ to $P_2'$ is amorphized. However, $t_1$ and $P_1$ are so set that crystallization may not be easily caused. That is to say $t_1'$ and $t_2'$ are defined to be $$\frac{2ar}{v}$$

or less, and $P_1$ is defined to be the erasing level or more. It is more desirable that the area of $t_1 40 \times (P_1' - P_E 1)$ is closer to that of $t_2 \times (P_E - P_2')$. In case of recording with 2 m/sec, for example, the reproduced signal waveform as shown in FIG. 12B could be obtained by recording information under the condition that $t_1' = t_2' = 0.5$ μs, $P_E 13$ mW, $P_1 = 18$ mW, and $P_2 = 8$ mW.

Figure 5:
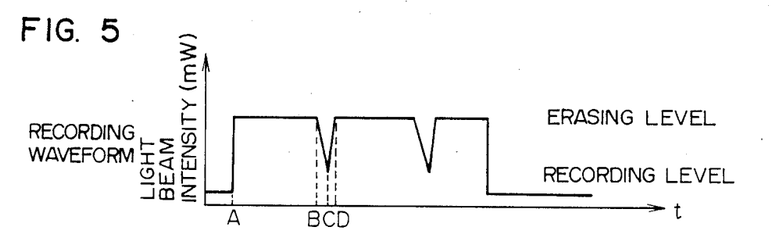

If a light beam which has undergone intensity modulation with time as shown in FIG. 5 is irradiated, a quenching effect is not obtained at a position B, and the temperature is within a temperature region of higher-speed crystallization between positions B and D. Even under the condition represented by expression (2), therefore, the reproduced waveform as shown in FIG. 1H can be obtained. Further in this case, it is preferred that the average slope of the power falling portion is smaller than the average slope of the power rising portion. It is further preferred that the slope of the power falling portion at an outer circumference of the disk is smaller than that at an inner circumference. Even if information is recorded with line velocities in a wide range, identical reproduced waveforms can thus be obtained by adjusting the recording waveform.

The present invention brings about four effects as described below.

(1) Single beam overwriting with little information unadvantageously left unerased becomes possible. By a simple beam information recording, readout and erasing apparatus such as a write once type optical disk apparatus, single beam overwriting can be surely realized.

(2) Even if the recording linear velocities are different to some degree (approximately twice), nearly identical reproduced waveforms can be obtained. Even if a disk-shaped optical information recording medium is rotated at a constant number of revolutions and the linear velocity at an inner circumference is different from that at an outer circumference, therefore, a single beam overwriting becomes possible.

(3) Since the relation between the recording line velocity and the crystallization speed for obtaining a desired reproduced waveform is given, an optimum readout waveform is obtained.

(4) Since the initialization is unnecessary, the time and labor can be reduced in the initial recording operation.

The method according to the present invention is applicable not only to a crystalline-amorphous phase change but also to optical recording using another phase change such as a crystalline-crystalline phase change or an amorphous-amorphous phase change. Further, the present invention can be applied to recording using an energy beam other than light such as electron rays.

What is claimed is:

1. An information recording method comprising the steps of:
    utilizing an information recording medium having a recording film enabling reversible phase change;
    irradiating said information recording medium with an energy beam while relatively moving the information recording medium and the energy beam so as too at least enable recording of information in accordance with phase state changes of the recording film caused by irradiation of the energy beam; and
    modulating an intensity of the energy beam so as to provide a first level having a high power for one portion of coded data information to be recorded, to provide a second level different from said first level for another portion of said coded data information for a predetermined time, and then to provide again said first level, thereby enabling recording of said coded data information independently of a previous recording state on said information recording medium.

2. An information recording method according to claim 1, wherein said first level having said high power enables a temperature of said recording film to rise above a melting point thereof.

3. An information recording method according to claim 2, wherein the following relation is satisfied:

$$t \leq 2r/v$$

where t is said predetermined time, r is a radius of a spot of said irradiated energy beam and v s a relative velocity of movement between said irradiated beam spot and aid information recording medium.

4. An information recording method according to claim 2, wherein said second level is lower than said first level.

5. An information recording method according to claim 2, wherein said second level is composed of a third level lower than said first level and a fourth level higher than said first level.

6. An information recording method according to claim 2, wherein said second level is composed of a third level higher than said first level and a fourth level lower than said first level.

7. An information recording method according to claim 1, wherein a portion in a substantially crystalline state is formed in said recording film by irradiation of said energy beam having said first level, and a portion of a substantially amorphous state is formed in said recording film by irradiation of sad energy beam having said second level.

8. An information recording method according to claim 1, wherein a portion in a substantially intermediate state between crystalline state and an amorphous state is formed in said recording film by irradiation of said energy beam having said first level, and a portion of a set of a substantially crystalline state and a substantially amorphous state is formed in said recording film by irradiation of said energy beam having said second level.

9. An information recording method according to claim 1, wherein a portion in a substantially amorphous state is formed in said recording film by irradiation of said energy beam having said first level, and a portion in a substantially crystalline state is formed in said recording film by irradiation of said energy beam having said second level.

10. An information recording method according to claim 5, wherein a portion in a substantially intermediate state between a crystalline state and an amorphous state is formed in said recording film by irradiation of said energy beam having said first level, and a portion in a substantially crystalline state s formed in said recording film by irradiation of said energy beam having said third and said fourth levels.

11. An information recording method according to claim 6, wherein a portion n a substantially intermediate state between a crystalline state and an amorphous state is formed in said recording film by irradiation of said energy beam having said first level, and a portion in a substantially amorphous state is formed in said recording film by irradiation of said energy beam having said third and said fourth levels.

12. An information recording method according to claim 4, wherein said second level is a range of from zero level to 182 of said first level and said predetermined time (t) is in a range of from 0.03 μsec. to 1 μsec.

13. An information recording method according to claim 12, wherein said second level is n a range of from a level sufficient for reproduction of said recorded information to 60% of said first level, and said predetermined time is in a range of from 0.1μsec. to 0.8μsec.

14. An information recording method according to claim 7, wherein said second level is in a range of from a level sufficient for reproduction of said recorded information to 60% of said first level, and said predetermined time is in a range of from 0.1 μsec. to 0.8 μsec.

15. An information recording method according to claim 8, wherein said second level is in a range of from a level sufficient for reproduction of said recorded information to 45% of said first level, and said predetermined time is in a range of from 0.03μsec. to 0.8μsec.

16. An information recording method according to claim 9, wherein said second level is in a range of from a level sufficient for reproduction of said recorded information to 45% of said first level, and said predetermined time is in a range of from 0.03μsec. to 0.5μsec.

17. An information recording method according to claim 10, wherein $t_1 \times (PE - P_2)$ is substantially equal to $t_2 \times (P_1 - PE)$ where PE is sad first level, $P_2$ is said third level, $P_1$ is said fourth level, $t_1$ is an irradiating time of said third level and $t_2$ is an irradiating time of said fourth level.

18. An information recording method according to claim 11, wherein $t_1 1' \times (P_1 1' - PE)$ is substantially equal to $t_{22} \times (PE - P_2')$ where PE is said first level, $P_1'$ is said third level, $P_2'$ is said fourth level, $t_1 1'$ is an irradiating time of said third level and $t_2 1'$ is an irradiating time of said fourth level.

19. An information recording method according to claim 3, wherein said first level and said second level are varied in accordance with said relative velocity.

20. An information recording method according to claim 19, wherein said first level and said second level are increased by $\sqrt{v}$ times.

21. An information recording method according to claim 3, wherein said information recording medium is a disk-shaped medium rotating at a predetermined number of revolutions,, and said first level and said second level are increased as information is recorded at a portion of said disk-shaped medium in a direction from an inner circumference toward an outer circumference thereof.

22. An information recording method according to claim 3, wherein said information recording medium is a disk-shaped medium rotating at a predetermined number of revolutions, and the crystallization speed of said disk-shaped medium is changed in a radial direction of the disk and increased from an inner circumference toward an outer circumference of the disk.

23. An information recording apparatus for recording information in accordance with the method set forth in claim 1, said apparatus comprising:
an energy source for emitting said energy beam;
an optical system for irradiating said recording film of said information recording medium with said energy beam emitted from said energy source;
moving means for changing a relative position of said irradiated energy beam with respect to said information recording medium; and
intensity-modulation means responsive to said coded data information to be recorded for intensity-modulating said energy beam so as to provide said first level having said high-power for said one portion off said coded at information, to provide said second level different from said first level for another portion of said coded data information for said predetermined time, and then to provide said first level again.

24. An information recording apparatus according to claim 13, wherein said energy source includes a semiconductor laser.

25. An information recording apparatus according to claim 24, wherein said intensity-modulation means includes a drive current circuit for driving said semiconductor laser.

26. An information recording apparatus according to claim 25, wherein said drive current circuit includes a current amplification circuit responsive to said coded data information to be recorded for outputting a current so as to obtain a first current value for said one portion of said coded data information, to provide a second current value different from said first current value for said predetermined time for another portion f said coded data information, and then to provide said first current value again.

27. An information recording apparatus according to claim 26, wherein said drive current circuit includes a bias current source, and a summinng circuit for adding a current from said current amplification circuit to a current from said bias current source and for applying the added currents to said semiconductor laser.

28. An information recording apparatus according to claim 27, wherein said drive current circuit establishes said first current value and a current value from said bias current source such that said first level of a high-powered beam emitted from said semiconductor laser is sufficient to raise a temperature of said recording film above a melting point thereof.

29. An information recording apparatus according to claim 28, wherein the following relation is satisfied:

$$t \leq 2 \, r/v$$

where t is sad predetermined time, r is a radius of a spot of said irradiated energy beam and v is a relative velocity of movement between said irradiated beam spot and said information recording medium.

30. An information recording apparatus according to claim 28, wherein sad drive current circuit establishes said first current value and a current value from said bias current source such that said second level of a beam emitted from said semiconductor laser is a lower level than said first level.

31. An information recording apparatus according to claim 28, wherein said drive current circuit establishes said second current value and a current value from said bias current source such thhat said second level of a beam irradiated from said semiconductor laser is composed of a third level lower than said first level and a fourth level higher than said first level.

32. An information recording apparatus according to claim 28, wherein said drive current circuit establishes said second current value and a current value from said bias current source such that said second level of a beam emitted from said semiconductor laser is composed of a third level higher than said first level and a fourth level lower than said first level.

33. An information recording apparatus according to claim 23, wherein a portion in a substantially crystalline state is formed in said recording film by irradiation of said energy beam having said first level, and a portion inn a substantially amorphous state is formed in said recording film by irradiation of said energy beam having said second level.

34. An information recording apparatus according to claim 23, wherein a portion in a substantially intermediate state between a crystalline state and an amorphous state is formed in said recording film by irradiation of said energy beam having said first level, and a portion of a set of a substantially crystalline state and a substantially amorphous state is formed in said recording film by irradiation of said energy beam having said second level.

35. An information recording apparatus according to claim 23, wherein a portion in a substantially amorphous state is formed in said recording film by irradiation of said energy having said first level, and a portion in a substantially crystalline state is formed in said recording film by irradiation of said energy beam having said second level.

36. An information recording apparatus according to claim 31, wherein a portion in a substantially intermediate state between a crystalline state and an amorphous state is formed in said recording film by irradiation of said energy beam having said first level, and a portion in a substantially crystalline state is formed in said recording film by irradiation of said energy beam having said third and said fourth levels.

37. An information recording apparatus according too claim 23, wherein a portion n a substantially intermediate state between a crystalline state and an amorphous state is freed n said recording film by irradiation of said energy beam having said first level, and a portion in a substantially amorphous state is formed is formed in said recording film by irradiation of said energy beam having said third and said fourth levels.

38. An information recording apparatus according to claim 23, further comprising:
 a detector for receiving and converting an energy beam reflected from said information recording medium into an electrical signal;
 a comparator for converting the electrical signal from said detector into a binary value by using a level different from an average level; and
 means for reproducing said coded data information already recorded on said information recording medium on the basis of an output of said comparator.

39. An information recording apparatus according to claim 23, further comprising:
 a detector for receiving and converting an energy beam reflected from said information recording medium into an electrical signal;
 a first comparator for converting the electrical signal from said detector into a binary value by using an average value;
 a differentiation circuit for differentiating an electrical signal from said detector;
 a second comparator for converting the output of said differentiation circuit into a binary value by using a predetermined level; and
 means for reproducing said coded data information recorded on said information recording medium on the basis of outputs of said first and second comparators.

* * * * *